Patented Oct. 7, 1930

1,777,606

UNITED STATES PATENT OFFICE

TEMOTHOUS M. EHLER, OF SLATER, MISSOURI

LEAK-SEALING COMPOUND

No Drawing.    Application filed February 7, 1929.    Serial No. 338,333.

This invention has for its object the provision of an efficient compound which may be placed in the radiators of motor vehicles and will operate automatically to stop any leaks therein. The invention provides a compound which may be freely handled without any ill-effects upon the user and which may be very easily poured into the water circulating system of the radiator and will act to automatically find and fill the leaks. The invention will be hereinafter described and then more particularly defined in the appended claims.

In carrying out the invention, I employ the following ingredients in the stated proportions by volume:

|  | Per cent |
|---|---|
| Ground white lead | 10 |
| Stale meat lard | 10 |
| Beef tallow | 15 |
| Soap | 20 |
| Lye | 5 |
| Cream fat | 5 |
| Pulverized cereal commonly sold under the trade-mark Wheatena | 5 |
| Flour | 10 |
| Wood sawdust | 10 |
| Linseed oil | 5 |
| Cinnamon | 5 |

These several ingredients are placed in any convenient vessel and agitated until thoroughly commingled and at the same time are ground together. After the mixing and grinding processes are completed, the compound will assume the form of small pellets or granules of irregular shape and of various dimensions. In use, a number of the pellets are poured into the water space of the radiator and the circulation of the water will carry it to the leaking spots and some of the pellets or granules will lodge in and seal the leaks.

The soap and lye serve to wash out the radiator and to remove all corrosion or rust and the lard floats to the top of the water and carries the sawdust saturated with the lead on the inside of the radiator and further cooperates with the tallow to cover the lead and hold it in the pores of the sawdust. The flour impregnates the grains of sawdust and causes the same to swell so that it will readily receive the lead which is held firmly in the pores of the wood by the flour. The cream fat absorbs the moisture and holds the material in a dry state while it is in storage or previous to its application to a radiator. The cereal finds its way to the outer side of the radiator through the leak and forms a film or coating over the leak on the outer surface of the radiator, while the oil serves to dissolve the white lead so that it will readily penetrate the pores of the wood and be carried thereby. The cinnamon is employed merely to give the material a pleasant odor while it is being handled.

When one of the pellets or granules is brought into the vicinity of a leak in the radiator, it tends to lodge therein and the outside air at once expands the pellet so that it will completely fill the leak and prevent any further flow of the circulating water therethrough. The lard, tallow and fat form carries to bring the lead-impregnated particles of sawdust to the leak and the sawdust holds the lead until the granule or pellet is lodged in the opening, whereupon the pellet or granule will immediately expand under the influence of the outside air and the pressure of the water in the radiator so that the opening will be completely filled and the lead and fats, together with the flour and cereal, will effectually seal the opening. The material of my invention has been satisfactorily tested and it has been noted that at times the action of the outside air upon a pellet or granule causes the same to swell until it has doubled in its volume. As a result of this swelling, it will be wedged in the opening and will completely fill the same so that no liquid can pass therethrough.

When the ingredients are being agitated and mixed, they are subjected to some pressure or kneading and, as the mixing proceeds, the composition assumes the form of small pellets. When the pellets are placed in the circulating system of a radiator, there is a tendency to dissolve, the soap and lye being liberated and thereupon acting as a cleaner to loosen all the dirt and rust. As the water heats, there is further dissolution and the tallow, lard and cream then constitute a carrier to float the rest of the material and also lubricate the walls of the radiator so as to resist further corrosion. While the tallow, lard and cream tend to float the pellets, the tendency is not strong enough to overcome the pressure of the hot water and the suction through the leaks so that the sawdust, flour and wheat with the white lead are carried into the leak and there, exposed to the air on the outside and the water pressure on the inside, expand so as to completely fill the leak while the lead and the linseed oil carried by it harden upon exposure to the air, forming a cement or solder on the exterior of the radiator which effectually closes the leak.

Having thus described the invention, I claim:

A leak-sealing compound consisting of white lead, lard, tallow, soap, lye, cream fat, pulverized cereal, flour, sawdust, and linseed oil ground together until they form pellets.

In testimony whereof I affix my signature.

TEMOTHOUS M. EHLER.